United States Patent [19]
Bloomquist

[11] Patent Number: 4,548,236
[45] Date of Patent: Oct. 22, 1985

[54] VEHICLE SUPPORTED FOLDABLE SERVICE CONDUIT

[75] Inventor: George W. Bloomquist, Long Beach, Calif.

[73] Assignee: FMC Corporation, Chicago, Ill.

[21] Appl. No.: 482,687

[22] Filed: Apr. 6, 1983

[51] Int. Cl.⁴ ............................................. F16L 27/00
[52] U.S. Cl. ................................. 137/615; 137/899; 74/52
[58] Field of Search ............... 137/615, 899; 74/52; 285/168, 181; 474/141, 150, 273

[56] References Cited

U.S. PATENT DOCUMENTS

| | | | |
|---|---|---|---|
| 3,053,320 | 9/1962 | Steincamp | 166/75 |
| 3,217,748 | 11/1965 | Harper | 137/615 |
| 3,281,080 | 10/1966 | Hogg | 137/615 |
| 3,362,432 | 1/1968 | Jameson | 141/388 X |
| 3,363,474 | 1/1968 | Ritter et al. | 74/52 |
| 3,399,909 | 9/1968 | Ambrose | 137/615 |
| 3,459,222 | 8/1969 | McElroy | 137/615 |
| 3,498,325 | 3/1970 | Ashton et al. | 137/615 |
| 3,721,260 | 3/1973 | Stahmer | 137/615 X |
| 3,805,627 | 4/1974 | Burton et al. | 74/52 |
| 3,942,554 | 3/1976 | Werner et al. | 137/615 |
| 4,029,126 | 6/1977 | Miyazoki et al. | 137/615 |
| 4,084,247 | 4/1978 | Ball | 141/387 X |
| 4,130,134 | 12/1978 | Castle | 137/615 |
| 4,341,242 | 7/1982 | Hermanson | 137/615 |
| 4,457,338 | 7/1984 | Moller et al. | 137/615 |

*Primary Examiner*—A. Michael Chambers
*Assistant Examiner*—John C. Fox
*Attorney, Agent, or Firm*—A. J. Moore; H. M. Stanley; R. B. Megley

[57] ABSTRACT

A fold control mechanism and method is provided in a foldable conduit system for accurately controlling the movement of a diagonal pipe section which extends above and below the pipes in the system. The fold control mechanism includes a first wheel rigidly secured to an extensible boom and a second wheel connected to the first wheel by a flexible connecting means. The second wheel is rigidly connected to the diagonal pipe section, rotates about its own axis, and rotates aproximately 180° about the axis of the first wheel to maintain control of the several pipes in the conduit system during the folding and unfolding operations.

4 Claims, 10 Drawing Figures

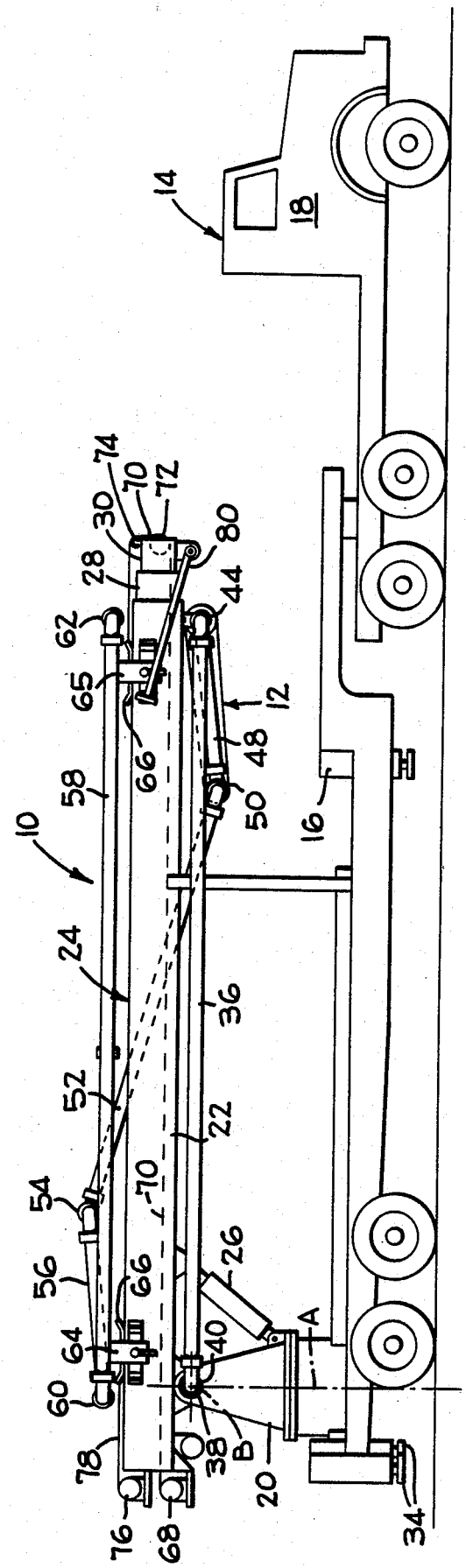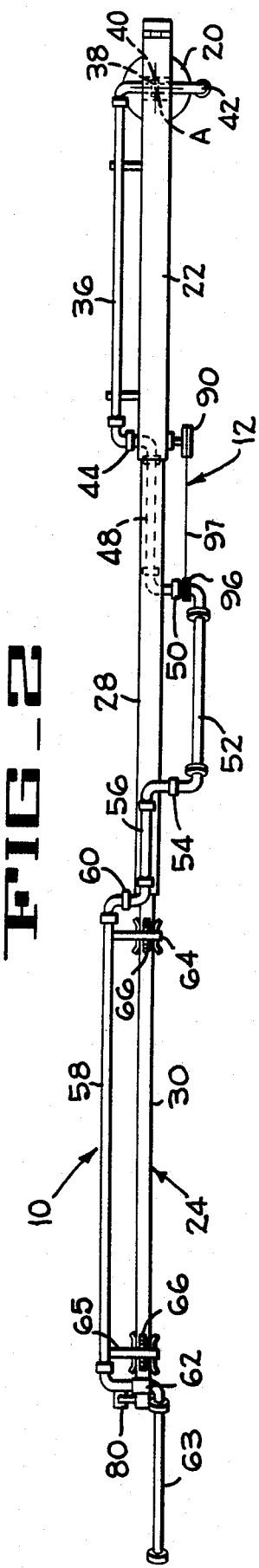

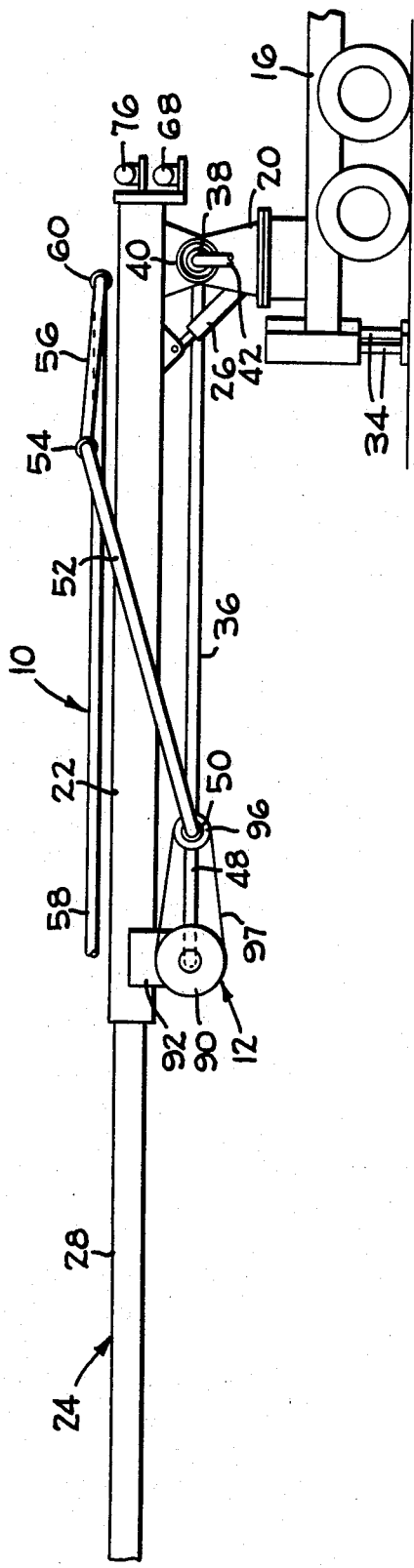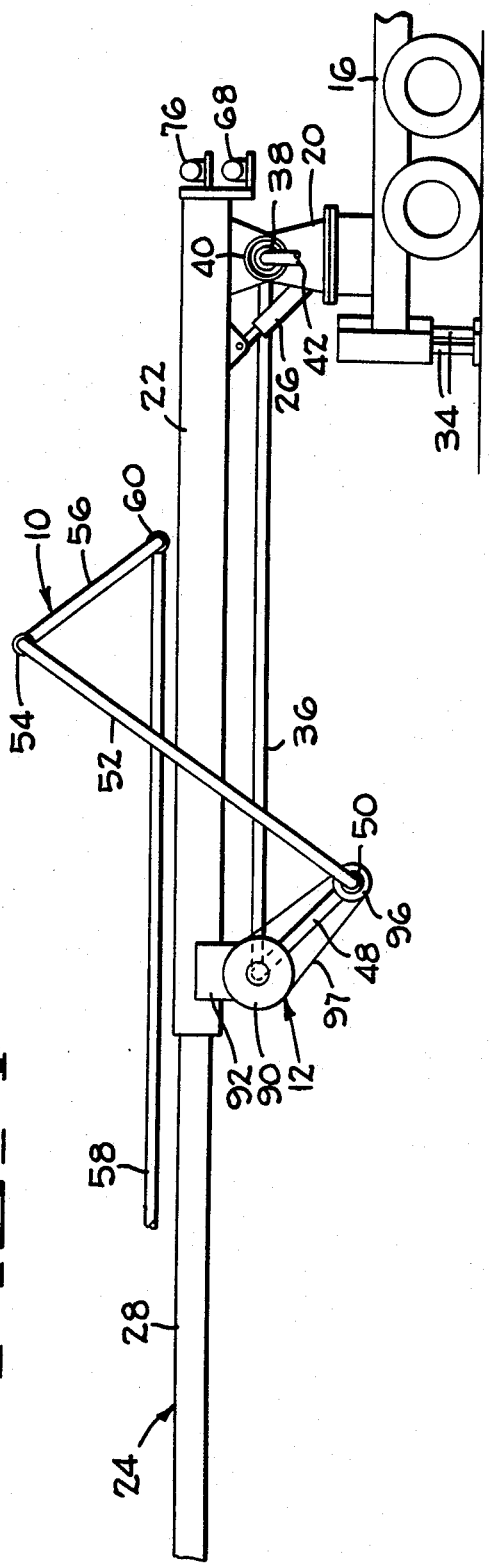

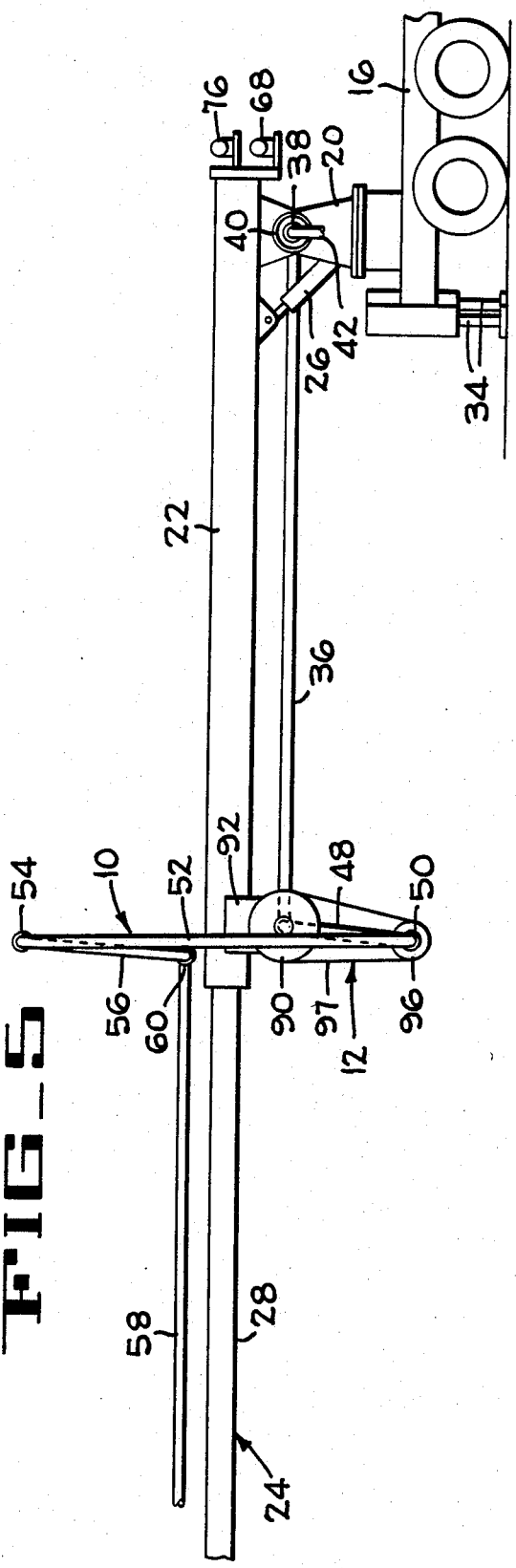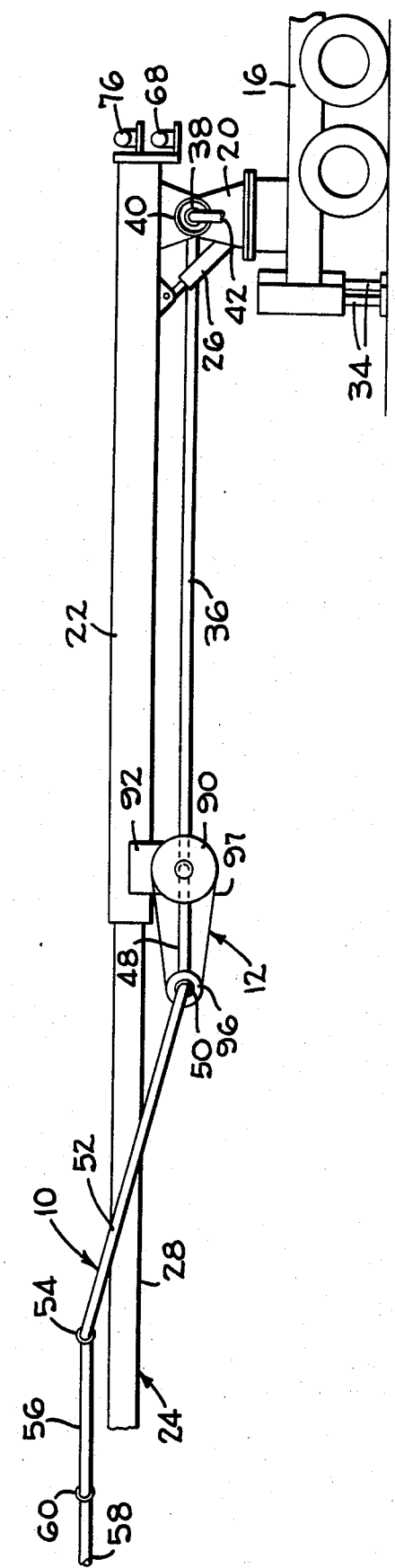

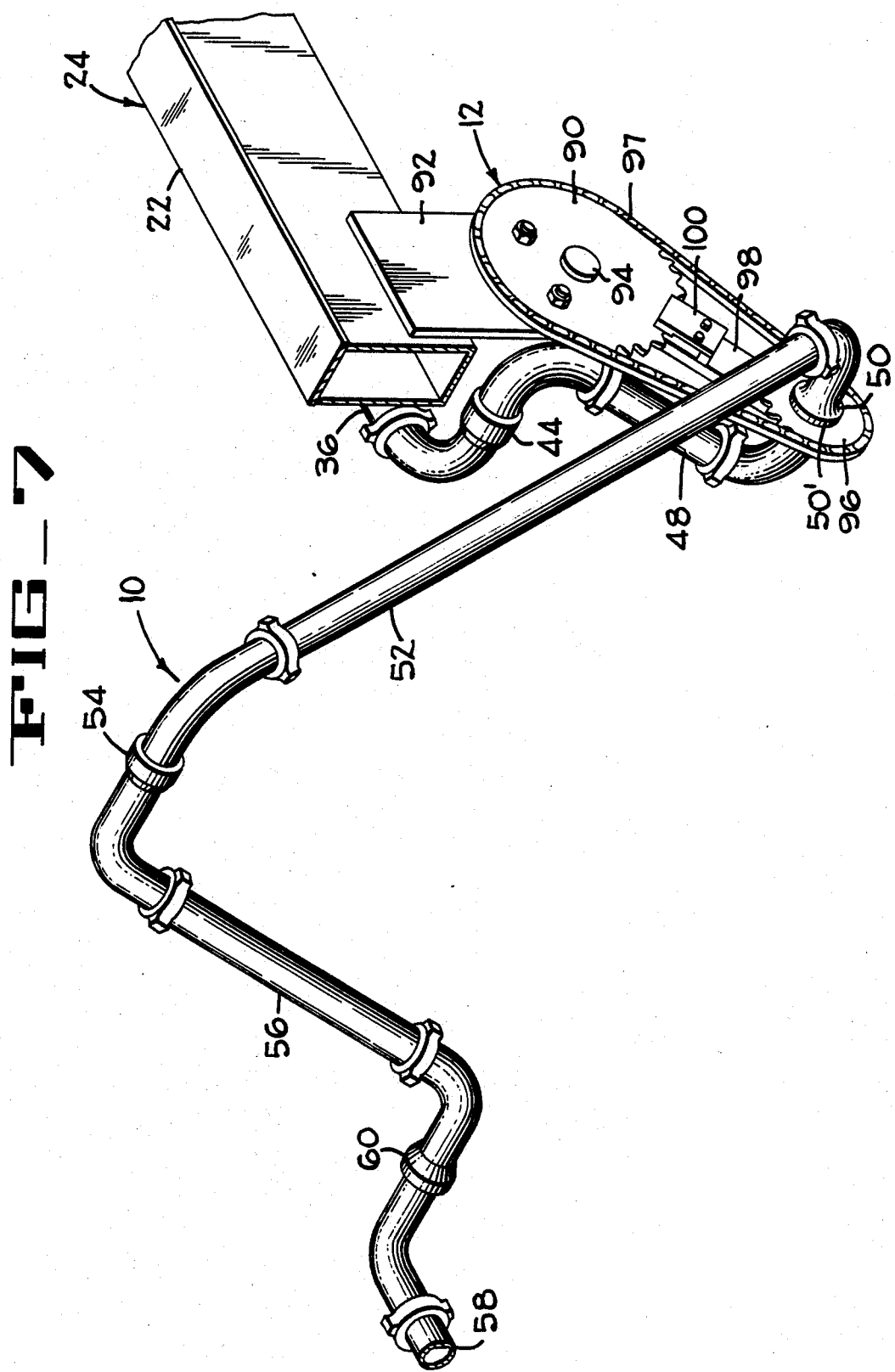

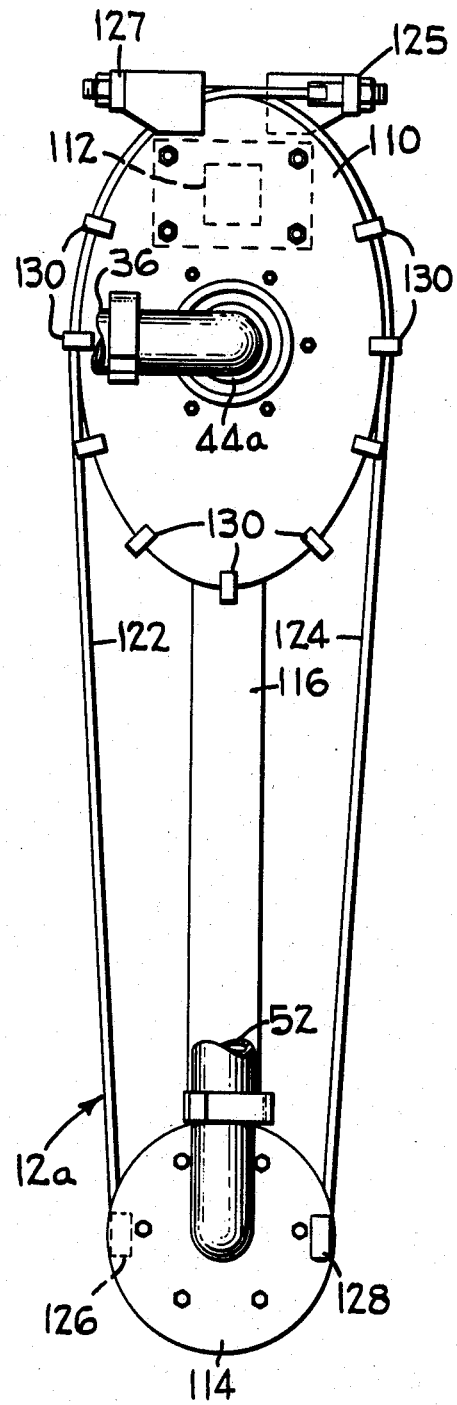
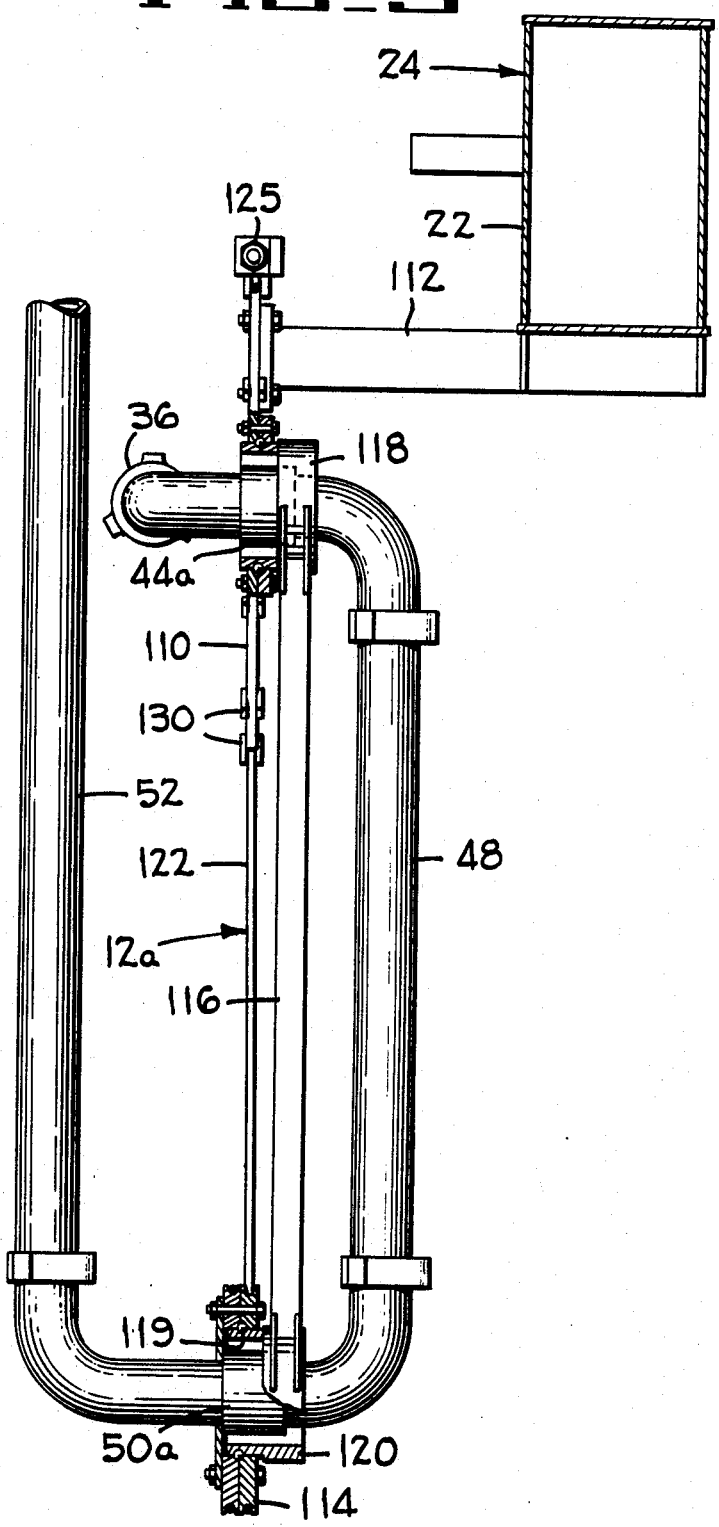
FIG_8
FIG_9

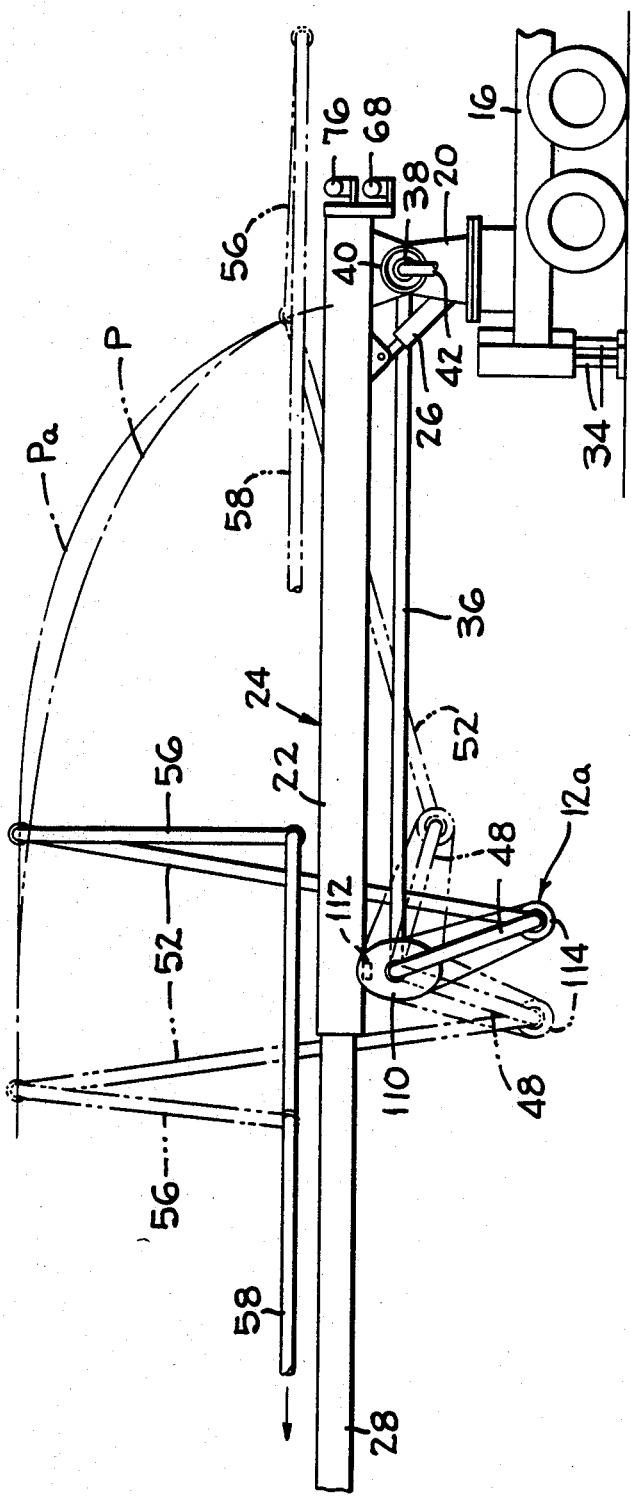
FIG_10

VEHICLE SUPPORTED FOLDABLE SERVICE CONDUIT

CROSS REFERENCE TO RELATED APPLICATION

The present invention is similar to the invention disclosed in assignee's Moller et al Application Ser. No. 469,359 filed on Feb. 24, 1983, now U.S. Pat. No. 4,457,338 which issued on July 3, 1984 and is entitled Telescoping Boom Supported Flip-Flop Service Line. The subject matter of this prior application is incorporated by reference herein.

BACKGROUND OF THE INVENTION

1. Field of the Invention

The present invention relates to portable well servicing equipment having a foldable service conduit thereon for conducting pressurized fluids to a wellhead, and more particularly relates to means and a method for insuring the proper sequence of folding and unfolding the several sections of the service conduit.

2. Description of the Prior Art

In order to improve the output of oil from oil wells, it is frequently desirable to inject fluid at high pressure, such as 20,000 psi, to fracture the producing rock formation or to dissolve or displace the flow obstructing materials. Pipe carrying vehicles are known for carrying pipes to and from the wellhead area, which pipes must be manually assembled on the ground and thereafter must be manually disassembled and loaded on the vehicle.

Assignee's above referred to application discloses a service line or foldable conduit connected together by swivel joints and supported on a vehicle by a telescopic boom, which conduit must be extended and retracted in order to unfold the conduit into operative extended position and fold the conduit in retracted transport position on the vehicle. However, no provision is made in this prior art apparatus to prevent rapid free-fall of certain sections of the conduit during extension and retraction of the conduit which is dangerous to personnel near the vehicle and which, upon occasion, may adversely affect the desired sequence of unfolding the several sections.

SUMMARY OF THE INVENTION

The present invention includes a fold controlling mechanism that comprises a flexible connecting member trained around a first wheel fixed to the boom and around a second wheel fixed to a swivel joint and to a diagonal pipe section in the articulating conduit for positively controlling the angular relationship of the diagonal pipe section and the boom in response to the second wheel being swung about the axis of the first wheel. In a first embodiment the first and second wheels are sprockets having a chain trained therearound. In a second embodiment the first wheel is an elliptical sheave and the second wheel is a circular sheave having one or more cables rigidly attached to each sheave.

BRIEF DESCRIPTION OF THE DRAWINGS

FIG. 1 is a diagrammatic side elevation of the foldable conduit system and fold controlling mechanism of the present invention supported by an extensible boom carried by a vehicle, the components of the foldable conduit system being shown in the folded transport position with the boom extending forward toward the cab of the vehicle.

FIG. 2 is a diagrammatic plan view taken at a smaller scale of the boom and conduit system with the boom pivoted 180° about a vertical axis and shown in its fully extended operative position directed rearwardly of the vehicle.

FIG. 3 is a diagrammatic operational side elevation of a pertinent portion of the boom and conduit system shown in folded condition and directed rearwardly of the vehicle.

FIGS. 4-6 are operational views similar to FIG. 3 but illustrating the pertinent portions of the conduit system in progressive operational positions with FIG. 6 illustrating the fully extended position.

FIG. 7 is an enlarged perspective of a first embodiment of the fold control mechanism of the present invention.

FIG. 8 is a side elevation of a second embodiment of the fold controlling mechanism of the present invention.

FIG. 9 is an elevation taken transversely of the boom looking toward the right in FIG. 8, certain parts being cut away and other parts being shown in section.

FIG. 10 is a diagrammatic side elevation of the second embodiment of the invention shown in two operative positions, said view additionally illustrating a higher path of travel of a swivel joint when using the second embodiment of the invention as compared to the lower path of travel when using the first embodiment of the invention.

DESCRIPTION OF THE PREFERRED EMBODIMENT

The foldable conduit system 10 and the fold control mechanism 12 are supported on a vehicle 14 which includes a trailer 16 connected to a conventional tractor 18 having an engine (not shown) which provides power for moving the vehicle 14 and also for driving a hydraulic pump (not shown). The trailer 16 carries a turret 20 mounted for pivotal movement about a vertical axis A. The turret supports the base section 22 of an extensible boom 24 for pivotal movement about a horizontal axis B upon actuation of a hydraulic cylinder 26. The boom includes an intermediate section 28 and a tip section 30. Conventional operator controlled means (not shown) are provided for extending and retracting the boom sections 28,30, for pivoting the boom 24 about vertical axis A, and for actuating the cylinder 26 to raise or lower the boom. During operation, the vehicle stabilizing outriggers 34 are lowered against the ground to stabilize the trailer 16.

The foldable conduit system 10 (FIG. 1) comprises a long inboard pipe 36 having an inlet end coupled to a swivel joint 38 (FIG. 1) which is connected to the turret for pivotal movement about axis B. The other end of the swivel joint 38 is connected to a supply pipe 42 which receives fluid at about 20,000 psi during operation from a source (not shown). The swivel joint 38 is loosely fitted within a tubular sleeve 40 of sufficient diameter to permit removal of the swivel joint from the boom 24 upon uncoupling the joint 38 from the pipe sections 36 and 42.

The other end of the inboard pipe 36 is supported by the base section 22 of the boom 24 and is coupled to a swivel joint 44 that is connected to one end of a short pipe section 48 having its other end connected to a swivel joint 50 and to a long diagonal pipe 52 which extends from below to above the boom 24 as best shown in FIG. 1. Another swivel joint 54 extends above the boom and is connected to a short pipe 56 which is connected to a long outboard pipe 58 by another swivel joint 60.

The discharge end of the outboard pipe 58 is connected by a swivel joint 62 to a discharge pipe 63 (FIG. 2) which is connected to a wellhead (not shown) when the foldable conduit system 10 is extended into its operative position as shown in FIG. 2.

As best shown in FIG. 2, all of the swivel joints, except the joints 38 and 40 include two elbows rotatable about linear sections of the several joints.

The outboard pipe 58 is secured to a pair of generally U-shaped slide brackets 64,65, each of which has two side shoes and an upper shoe 66 slidably received on the three sections of the boom 24. Since the three boom sections are of progressively smaller cross sections, all of the shoes 66 have outwardly beveled end portions and one of the side shoes is spring urged against the boom 24. Although shoes 66 are illustrated in FIGS. 1 and 2, it will be understood that wheels may be substituted for the shoes if desired.

In order to extend the foldable conduit system 10, the boom is first extended. The operator then actuates a hydraulically powered winch 68 in a clockwise direction. The winch is connected to the base section of the boom and has its wire rope 70 extending through the boom, trained over sheaves 72,74 on the tip section 30 of the boom and secured to the front slide bracket 65. In order to retract the foldable conduit system 10, a second winch 76 is connected to the rear of the base section 22 and has its wire rope 78 connected to the rear slide bracket 64. The winch 76 is driven in a counterclockwise direction (FIG. 1) to retract the foldable conduit system 10.

An adjustable jack stand 80 is illustrated in stowed position in FIG. 1 connected to the outer end of the boom's tip section 30. When the boom 24 is fully extended the jack stand 80 may be pivoted vertically downward to support the tip end of the boom as shown in FIG. 2.

As above described, the foldable conduit system 10 and its supporting structure is substantially the same as a single conduit system disclosed in assignee's aforementioned copending cross-referenced application.

The first embodiment of the fold control mechanism 12 (FIG. 7) comprises a large diameter sprocket 90 rigidly secured to the outer end of the base section 22 of the boom 24 by a bracket 92 and a stub shaft 94. A small diameter sprocket 96 is rigidly connected to the portion 50' of the swivel joint 50 that is rigidly connected to the diagonal pipe 52. An endless chain 97 is trained over the sprockets 90 and 96. A sprocket spacing arm 98 is journaled on the swivel joint 50 and on the stub shaft 94 to maintain the sprocket in planar alignment and spaced a predetermined distance from each other. An optional brake or friction pad 100 may be bolted to the arm 98 in position to slidably engage the large diameter sprocket 90 for providing a predetermined resistance to rotation of the small diameter sprocket about the large diameter sprocket.

Since the rotatable sprocket 96 is fixed to the pipe 52, and is connected to the fixed sprocket 90 by the chain 97, it is apparent that movement of the sprocket 96 between the fully folded transport position of FIGS. 1 and 3 to the fully extended position of FIG. 6 will bodily swing the small sprocket 96 approximately 180° about the axis of the stub shaft 94 of the fixed sprocket 90 as clearly illustrated by a comparison of FIGS. 3 and 6. It will also be noted that a comparison of FIGS. 3 and 6 clearly illustrates that rotation of the sprocket 96 about its own axis of rotation as well as about the axis of generation of the sprocket 90 causes the diagonal pipe 52 to move through an angle of less than 180° in response to bodily movement of the sprocket 96 through an angle of about 180°. A predetermined sprocket tooth or peripheral ratio of the two sprockets is needed in order to rotate the sprocket 96 through the desired arc while rotating the upper end of the diagonal pipe 52 between its fully extended and fully retracted positions. This ratio has been found to be about 1.875 to 1.

The second embodiment of the fold controlling mechanism 12a (FIGS. 8 and 9) comprises an elliptical cable sheave 110 rigidly secured to the base section 22 of the boom 24 by a bracket 112. A swivel joint 44a is concentric with and extends through the elliptical sheave 110 and is connected to conduits 36 and 48. A swivel joint 50a is coupled to the conduits 48 and 52, and a small diameter groove cable sheave 114 is rigidly and eccentrically secured to the portion of the swivel joint 50a which is rigidly secured to the pipe 52 to compensate for the varied effective radius of the elliptical sheave 110. A spacer arm 116 is rigidly secured to hubs 118 and 120 which are journaled within the fixed elliptical sheave 110 and the small diameter sheave 114, respectively by bearings 119. The spacer arm 116 maintains the desired spacing between the axes of the sheaves 110 and 114. As best shown in FIG. 8, a pair of cables 122,124 have their lower ends secured to associated grooves in the small sheave 114 by clamps 126,128, respectively. The upper ends of the cables 122,124 are anchored to adjustable cable clamps 127,125 that are secured to the sheave 110 thereby maintaining proper tension on the cables 122,124. Space cable guides 130 are secured to the sheave 110 for guiding the two cables around the periphery of the elliptical sheave 110 as the lower sheave is moved through its substantially 180° arc about the axis of the elliptical sheave.

A predetermined ratio of the sheaves 110 and 114 114 of about 1.958 to 1 provides a controlled movement of the pipe 52 between its fully extended and fully retracted positions relative to the pipe 48 and arm 116 as will be made apparent hereinafter.

The operation of the two embodiments of the invention are similar, accordingly, the progressive operation of the first embodiment will be given starting from the folded storage position of FIG. 1 and ending with the conduit system 10 fully extended as shown in FIG. 2.

The operator first positions the vehicle adjacent a wellhead (not shown) with the wellhead at the rear of the vehicle. Upon actuating conventional controls, the operator then raises the boom slightly with cylinder 26, and then rotates the boom about the vertical axis A by hydraulic means (not shown). The operator then extends the boom, lowers the tip of the boom, and adjusts the jack stand 80 to support the outer end of the boom all as is conventional in the art.

The operator then actuates the winch 68 (FIG. 1) which moves the outboard pipe 58, which in turn moves the conduit system 10 from the position illustrated in FIG. 3 to the position illustrated in FIG. 4. Since the sprocket 90 is rigidly secured to the boom 24 and since the sprocket 96 is rigidly secured to the diagonal pipe section 52, the chain 97 prevents uncontrolled pivotal movement relative to each other. Thus, the pulling force on pipe 58 toward the left (FIG. 4) cannot pull swivel joint 60 past the pipe 52 until the pipe 52 reaches its substantially vertical position as illustrated in FIG. 5. Continued movement of the pipe 58 to the left (FIG. 4) will complete extension of the conduit system 10 as illustrated in FIGS. 2 and 6. During extension of the conduit system 10, the small sprocket 96 of the fold control mechanism 12 pivots approximately 180° and the first half of the path of travel of the swivel joint 54 is identified as path P in FIG. 10. It will be appreciated that during this first portion of travel, the pipe 56 will exert a downward force on pipe 58, but will not contact the top of the boom because the fold controlling mechanism 12 controls the gradually diminishing angle between pipes 48 and 52. When the pipe 52 moves past its vertical position, an upward force is applied to the pipe 56 which is insufficient to raise the pipe 58 from its illustrated position parallel to the boom 24 due to the weight of the outboard pipe 58 and the engagement of the slide bracket 64,65 (FIG. 1) with the boom 24.

The previously described brake or friction pad 100 (FIG. 7) may be used to prevent chain slack or gravity to interfer with the smooth operation of the foldable conduit system 10.

Retraction of the foldable conduit system 10 into its folded transport position of FIG. 1 is accomplished by actuating the winch 76 and is substantially the reverse of that described above.

The operation of the second embodiment of the fold control system 12a is substantially the same as that described above except the elliptical sheave 110 provides a higher path of travel identified as Pa in FIG. 10. It will be noted that the path of travel of the upper portion of the upper swivel joint 54 remains substantially parallel to the boom 24 for a greater distance at its upper portion of travel thereby allowing the pipe section 56 to pass freely when extending or retracting the pipe sections.

Although a single conduit system 10 has been illustrated and described, it will be understood that it is within the scope of the invention to provide a dual pipe system as disclosed in the aforementioned copending application if a large fluid flow capacity is required.

From the foregoing description it will be apparent that a fold control mechanism is provided for maintaining control of the folding of a conduit system between a compactly folded transport position on a vehicle and an unfolded extended position. The fold control mechanism includes a large wheel fixed to a boom and a small wheel fixed to a pipe section having opposite end portions which extend above and below the boom. The two wheels are connected by one or more flexible members and ratios of the periphery of the two wheels is predetermined so that movement of the smaller wheel about 180° around the axis of the other wheel will pivot the upper end of the pipe section between its retracted storage position, and its fully extended operative position which controllably folds and unfolds the foldable conduit system of the present invention.

Although the best mode contemplated for carrying out the present invention has been herein shown and described, it will be apparent that modification and variation may be made without departing from what is regarded to be the subject matter of the invention.

What is claimed is:

1. A fold control mechanism in a foldable conduit system which includes frame means and a plurality of pipe sections connected together by swivel joints and movable between a folded position with certain pipes overlapping each other and an operative position with the pipes extending substantially linearly from each other, the improvement comprising:

first wheel means rigidly secured to the frame and having an axis of generation;
   second wheel means smaller than said first wheel means and having an axis of rotation;
   spacer means interconnecting said second wheel means to said first wheel means, said second wheel means being disposed for rotation about its own axis and about said axis of generation of said first wheel means;
   flexible connecting means trained around portions of said first and second wheel means;
   a swivel joint extending through said second wheel means and having a first portion thereof rigidly connected to said second wheel means and a second portion rotatable relative to said first portion;
   a first pipe section of said foldable conduit section connected to said first swivel joint portion and extending from below to above the pipe sections in said foldable conduit system when in said folded position;
   a second pipe section connected to said second portion of said swivel joint; and
   power means connected to said foldable conduit system for moving the system between its folded and extended positions;
   said frame means being a portion of a mobile vehicle;
   said first wheel means being an elliptical sheave, said second wheel means being a small diameter sheave, and said flexible connecting means being a pair of cables having end portions anchored to said elliptical and small diameter sheaves.

2. An apparatus according to claim 1 wherein said eliptical sheave and said small diameter sheave have a peripheral ratio of about 1.95 to 1 enabling the first pipe section to move between said folded and said extended positions in response to about 180° of pivotal movement of said small diameter sheave about said elliptical sheave.

3. An apparatus according to claim 1 wherein said elliptical sheave and small diameter sheave have a peripheral ratio of about 1.95 to 1 enabling said first pipe section to move between said folded and said unfolded positions in response to about 180° of pivotal movement of said small diameter sheave about said elliptical sheave.

4. A fold control mechanism in a foldable conduit system supported by an extensible boom on a movable vehicle; said conduit system including parallel outboard and inboard pipes adjacent opposite walls of said boom, a short pipe coupled for rotation to the outboard, another short pipe section coupled for rotation to the inboard pipe section, and a diagonal pipe section coupled for rotation to the other ends of said short pipe sections; and power means connected to said outboard pipe section for controlling movement of said outboard pipe section relative to said boom for folding and unfolding said foldable conduit system; the improvement comprising:

first wheel means rigidly secured to said boom and having an axis of generation;
   second wheel means spaced from said first wheel means and rigidly connected to said diagonal pipe section, said second wheel means being rotatable about its own axis and rotatable about the axis of said first wheel means, said second wheel means having a diameter smaller than that of said first wheel means; and flexible connecting means being trained around said first and second wheel means, said first and second wheel means having a peripheral ratio responsive to said power means for moving said diagonal pipe section from one side of a plane that is substantially normal to said boom to the other side of said plane thereby causing the short pipe sections to move through said plane to opposite sides of said plane when said diagonal pipe section is within the plane thereby permitting reliable folding and unfolding of said boom;

said first wheel means being an elliptical sheave, said second wheel means being a small diameter sheave, and said flexible connecting means being a pair of cables having end portions anchored to said elliptical and small diameter sheaves.

* * * * *